(12) United States Patent
Nagayama et al.

(10) Patent No.: US 7,530,386 B2
(45) Date of Patent: May 12, 2009

(54) HEAT-REMOVING DEVICE AND HEAT-REMOVING METHOD OF VEHICLE INTERIOR PART

(75) Inventors: Hiroki Nagayama, Yokohama (JP); Hajime Kato, Ebina (JP); Teruaki Ishikawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 489 days.

(21) Appl. No.: 11/313,638

(22) Filed: Dec. 22, 2005

(65) Prior Publication Data

US 2006/0140594 A1 Jun. 29, 2006

(30) Foreign Application Priority Data

Dec. 24, 2004 (JP) ............................. 2004-374900
Dec. 24, 2004 (JP) ............................. 2004-374906

(51) Int. Cl.
*B60H 1/00* (2006.01)

(52) U.S. Cl. ...................... 165/41; 165/42; 165/104.21; 165/104.26; 62/244

(58) Field of Classification Search ................... 165/41, 165/42, 104.21, 104.26; 62/244
See application file for complete search history.

(56) References Cited

U.S. PATENT DOCUMENTS 3,618,854 A * 11/1971 Frank ........................ 165/287
4,658,599 A * 4/1987 Kajiwara .................... 62/244
5,036,905 A * 8/1991 Eninger et al. ................ 165/41
5,950,710 A * 9/1999 Liu ............................. 165/41
6,964,294 B2 * 11/2005 Hendricks et al. ............. 165/41

FOREIGN PATENT DOCUMENTS

| DE | 42 19 938 A1 | 12/1992 |
|---|---|---|
| FR | 2 839 473 A1 | 11/2003 |
| JP | 2574402 Y2 | 3/1998 |
| JP | 2004-58943 A | 2/2004 |
| JP | 2004-84970 A | 3/2004 |
| JP | 2004-138366 A | 5/2004 |
| WO | WO 02/092369 A1 | 11/2002 |

* cited by examiner

*Primary Examiner*—Ljiljana (Lil) V Ciric
(74) *Attorney, Agent, or Firm*—Foley & Lardner LLP

(57) ABSTRACT

A heat-removing device for a vehicle including: an interior part having a plate portion exposed to direct sunlight including a baseboard formed of a resin or a composite material containing a resin and a skin material which covers an outer surface of the baseboard; a heat conducting plate for collecting heat from the skin material, provided on an inner side of the skin material of the plate portion and inside of an inner surface of the baseboard in a direction of a thickness of the baseboard; and a heat pipe provided on an inner side of the inner surface of the baseboard and connected in heat-conductive relationship to the heat conducting plate, which transfers heat collected by the heat conducting plate to a heat releasing device.

11 Claims, 15 Drawing Sheets

FIG.5

| | | INTERIOR PART | | HEAT CONDUCTING PLATE | | | HEAT PIPE | | SKIN MATERIAL | TEMPERATURE | | | EVALUATION |
|---|---|---|---|---|---|---|---|---|---|---|---|---|---|
| | | NAME | THICKNESS T (mm) | THICKNESS t (mm) | t/T (-) | AREA (m²) | MATERIAL | SHAPE | | PANEL OUTSIDE (°C) | PANEL SURFACE (°C) | PANEL INSIDE (°C) | |
| EMBODIMENT | CASE 1 1ST EMBODIMENT | INSTRUMENT PANEL | 3.00 | 0.50 | 16.7 | 0.48 | COPPER | STRAIGHT | SOFT PAD | 54 | 57 | 54 | GOOD |
| | CASE 2 1ST EMBODIMENT | INSTRUMENT PANEL | 3.00 | 0.50 | 16.7 | 0.48 | COPPER | STRAIGHT | POLYETHYLENE FOAM (OPEN-CELL POLY FOAM) | 58 | 63 | 52 | GOOD |
| COMPARATIVE EXAMPLE | - | INSTRUMENT PANEL | 3.00 | 0.50 | 16.7 | 0.48 | COPPER | STRAIGHT | NONE | 70 | 75 | 75 | NO GOOD |

FIG.15

| | | INTERIOR PART | | HEAT CONDUCTING PLATE | | | | | HEAT PIPE | | SKIN MATE-RIAL | TEMPERATURE | | | MOLDA-BILITY |
|---|---|---|---|---|---|---|---|---|---|---|---|---|---|---|---|
| | | THICK-NESS T (mm) | AREA S (m²) | SHAPE | THICK-NESS t (mm) | t/T (-) | AREA s (m²) | s/S (-) | MATERIAL | SHAPE | SOFT PAD | PANEL OUTSIDE (°C) | SUR-FACE (°C) | PANEL INSIDE (°C) | |
| EMBODI-MENT | CASE 1 5TH EMBODI-MENT | 3.00 | 0.52 | COMB-LIKE SHAPE | 1.00 | 0.3 | 0.26 | 0.50 | COPPER | STRAIGHT | NONE | 55 | 58 | 56 | GOOD |
| | CASE 2 9TH EMBODI-MENT | 3.00 | 0.52 | LADDER-LIKE SHAPE | 1.00 | 0.3 | 0.32 | 0.62 | COPPER | STRAIGHT | NONE | 54 | 57 | 55 | TOLERA-BLE |
| | CASE 3 8TH EMBODI-MENT | 3.00 | 0.52 | STRIP-LIPE SHAPE | 1.00 | 0.3 | 0.29 | 0.55 | COPPER | STRAIGHT | NONE | 55 | 59 | 56 | GOOD |
| | CASE 4 10TH EMBODI-MENT | 3.00 | 0.52 | LATTICE-LIKE SHAPE | 1.00 | 0.3 | 0.32 | 0.62 | COPPER | STRAIGHT | NONE | 54 | 57 | 56 | GOOD |
| COMPARA-TIVE EXAMPLE | CASE 1 - | 3.00 | 0.52 | STRIP-LIPE SHAPE | 1.50 | 0.5 | 0.08 | 0.15 | COPPER | STRAIGHT | NONE | 68 | 72 | 72 | GOOD |
| | CASE 2 - | 3.00 | 0.52 | SINGLE PLATE | 0.50 | 0.2 | 0.48 | 0.92 | COPPER | STRAIGHT | NONE | 70 | 75 | 75 | NO GOOD |

HEAT-REMOVING DEVICE AND HEAT-REMOVING METHOD OF VEHICLE INTERIOR PART

BACKGROUND OF THE INVENTION

1. Field of Invention

The present invention relates to a heat-removing device and a heat-removing method to remove heat from a vehicle interior part to the outside.

2. Description of Related Art

When a vehicle is left parked in a place subject to direct sunlight for a certain period of time, temperature of a vehicle interior part will become considerably high. Under such circumstance, temperature of an upper surface of an instrument panel disposed directly below the windshield may exceed 90 degree centigrade [° C.]. The heat accumulated on the instrument panel tends to be radiated into the air in a vehicle passenger compartment, which is considered as one of main reasons to increase the temperature of the vehicle passenger compartment.

Japanese Patent Application Laid-Open Publication No. 2004-58943 discloses a device for removing heat accumulated on an instrument panel using a heat pipe connected to a vehicle body and a chassis. The heat pipe is embedded in the instrument panel with a part thereof fit in a groove formed on an inner side of the instrument panel.

SUMMARY OF THE INVENTION

The instrument panel is usually formed of a synthetic resin material, which exhibits a large thermal capacity with less thermal conductance. However, in the aforementioned device, since the heat pipe is merely embedded in the inner side of the instrument panel, the heat of the entire instrument panel cannot be collected and conducted to the heat pipe efficiently, thus deteriorating the heat removing efficiency of the instrument panel.

The present invention is made in the light of the problem. An object of the present invention is to provide a heat-removing device and a heat-removing method for a vehicle interior part exposed to the direct sunlight, capable of efficiently transferring the heat accumulated on the vehicle interior part to a heat pipe, thus improving the heat-removing efficiency of the vehicle interior part.

Another object of the present invention is to provide a heat-removing device and a heat-removing method for a vehicle interior part exposed to the direct sunlight, capable of improving moldability of the vehicle interior part.

An aspect of the present invention is a heat-removing device for a vehicle comprising: an interior part having a plate portion exposed to direct sunlight, the plate portion comprising a baseboard formed of a resin or a composite material containing a resin, and a skin material which covers an outer surface of the baseboard; a heat conducting plate provided on an inner side of the skin material of the plate portion and inside of an inner surface of the baseboard in a direction of a thickness of the baseboard, which collects heat from the skin material; and a heat pipe provided on an inner side of the inner surface of the baseboard and connected in heat-conductive relationship to the heat conducting plate, which transfers heat collected by the heat conducting plate to a heat releasing device.

BRIEF DESCRIPTION OF THE DRAWINGS

The invention will now be described with reference to the accompanying drawings wherein:

FIG. 5 is a table showing each heat-removing effect of the first embodiment of the present invention and the comparative example.

FIG. 15 is a table showing each heat-removing effect of the fifth, eighth, ninth, and tenth embodiments of the present invention and the comparative example.

DETAILED DESCRIPTION OF THE PREFERRED EMBODIMENT

Figure 1:
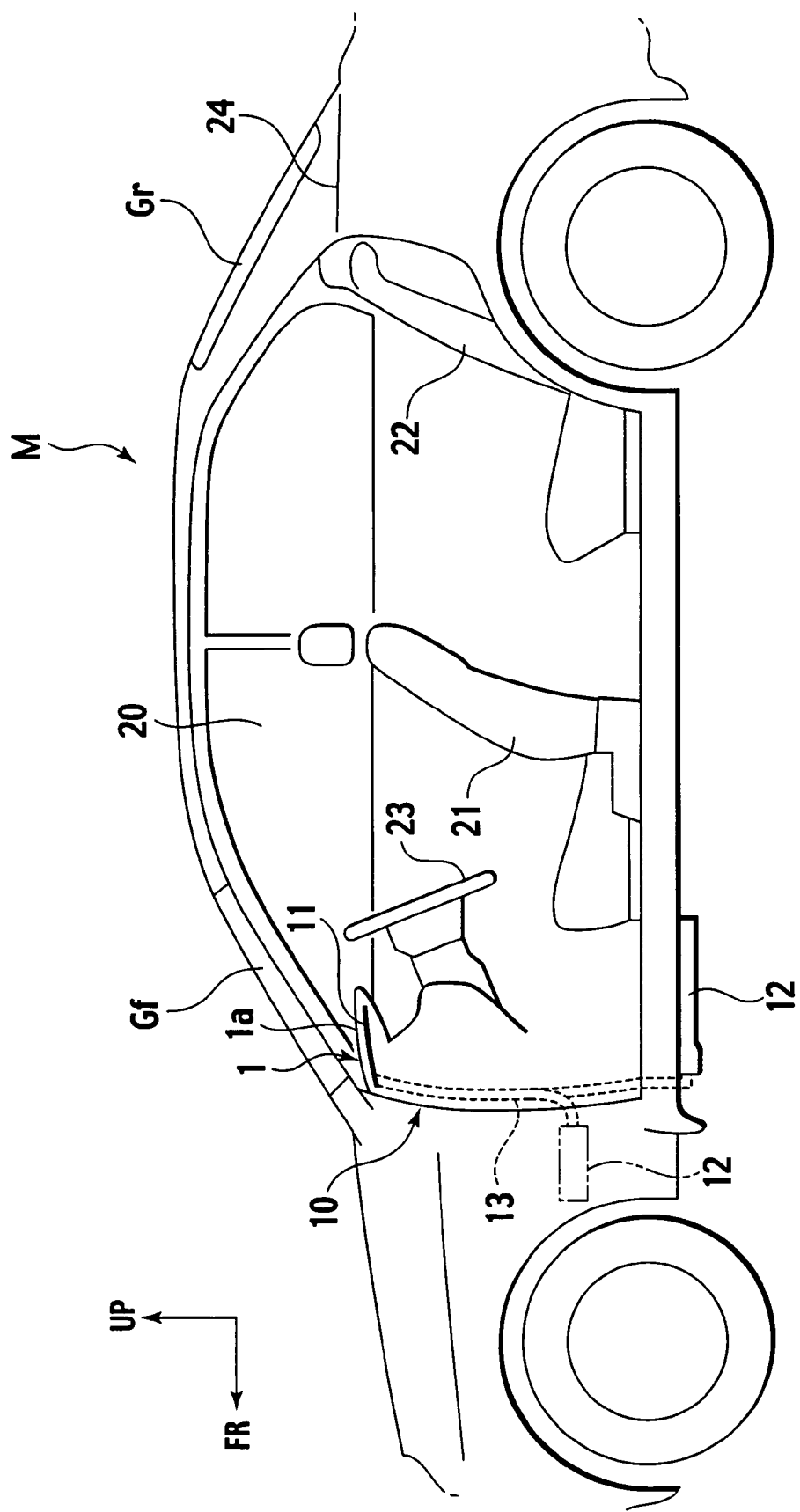
FIG. 1 is a side view of a vehicle passenger compartment to which the present invention is applied.

Embodiment of the present invention will be explained below with reference to the drawings, wherein like members are designated by like reference characters.

First Embodiment

As shown in FIG. 1, an instrument panel 1 is an interior part located just below a windshield Gf of a vehicle M and exposed to direct sunlight. A vehicle heat-removing device 10 according to the embodiment is installed to the instrument panel 1, so as to restrain excessive increase in the temperature thereof when the vehicle M is left parked in a place subject to direct sunlight for a certain period.

In a vehicle passenger compartment 20, there are front seats 21 including a driver's seat and a passenger seat behind the instrument panel 1, and a rear seat 22 therebehind. At the driver's seat side of the front seats 21, there is a steering wheel 23 at a lower portion of the instrument panel 1.

A rear parcel shelf 24 as another vehicle interior part is provided directly below a rear windshield Gr in the rear of the vehicle passenger compartment 20.

The incident direct sunlight through the windshield Gf is irradiated onto the surface of a top board (or a dashboard) 1a of the instrument panel 1. The top board 1a of the instrument panel has a plate-like structure including a baseboard 2 formed of a resin material or a composite material containing the resin, and a skin material 3 that covers the outer/upper surface of the baseboard 2. In the description to be explained below, the upper portion of the top board 1a of the instrument panel corresponds to the outer portion of the instrument panel 1, and the lower portion of the top board 1a corresponds to the inner portion of the instrument panel 1.

Figure 2:
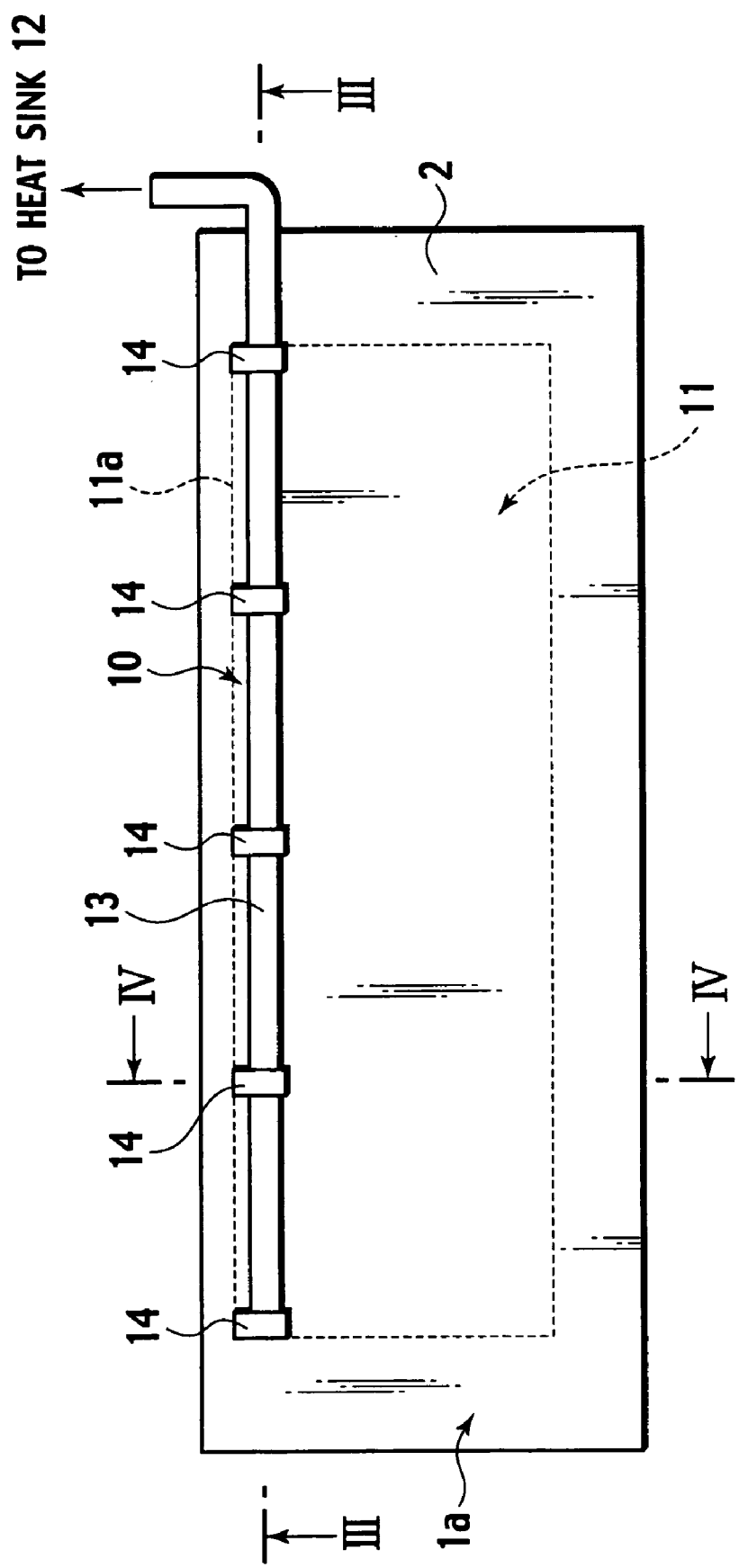
FIG. 2 is an enlarged bottom view of an essential portion of an instrument panel to which a heat-removing device for a vehicle according to a first embodiment of the present invention is installed.
Figure 3:
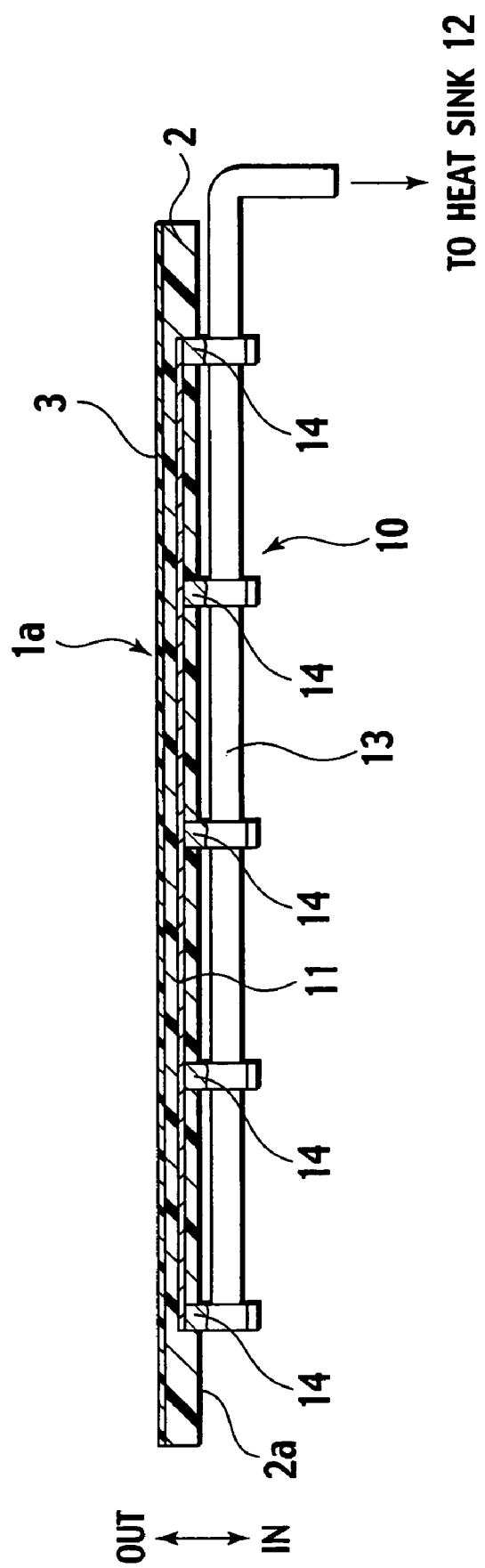
FIG. 3 is a sectional view taken along the line III-III of FIGS. 2 and 10.

The vehicle heat-removing device 10 according to the embodiment is provided with a heat conducting plate 11 and a heat pipe 13 as shown in FIGS. 2 and 3. The heat conducting plate 11 is disposed on the inner side of the skin material 3 (lower side in FIG. 3), and inside in the direction of the thickness of the baseboard 2 (the upper side in FIG. 3, hereinafter, referred to as "the baseboard thickness direction") of an inner surface 2a of the baseboard 2, that is, inside of the baseboard 2, so as to collect the accumulated heat on the skin material 3 upon receipt of the direct sunlight. The heat pipe 13 is provided on an inner side of the inner surface 2a of the baseboard 2 and connected in heat-conductive relationship to the heat conducting plate so as to transfer the accumulated heat of the skin material 3 collected by the heat conducting plate 11 to a heat sink 12 (see FIG. 1) as a heat-releasing device.

A heat-removal of the instrument panel 1 according to the embodiment is accomplished in the following manner. The heat of the direct sunlight that has been accumulated on the skin material 3 is collected by the heat conducting plate 11 provided on the inner side of the skin material 3 of the top board 1a of the instrument panel, and inside in the baseboard thickness direction of the inner surface 2a thereof, that is, inside of the baseboard 2, and then the heat of the skin material 3 collected by the heat conducting plate 11 is transferred to the heat sink 12 through the heat pipe 13.

The heat pipe 13 is a well-known device to transfer heat of a specific portion to the other portion using latent heat resultant from evaporation and condensation of liquid. Typical heat pipe has a hollow tubular structure in which a liquid such as water and alcohol is sealed in. The sealed liquid is evaporated at an end of the heat pipe, receiving heat transferred to the end of the heat pipe, and is condensed and liquefied at the other end of the heat pipe while releasing heat to the heat sink. The resultant liquid is re-circulated to the opposite end again. The aforementioned cycle constitutes the basic structure of the heat pipe 13. However, various types of heat pipe using the aforementioned basic structure may be employed in this embodiment.

In this embodiment, the heat pipe 13 is formed as a linear/straight heat pipe having its portion disposed on the heat conducting plate 11 linearly formed.

The heat sink 12 is located on a position to be exposed to the air outside of the passenger compartment 20, for example, on a body panel, a chassis, or a lower surface of a floor panel.

Figure 4:
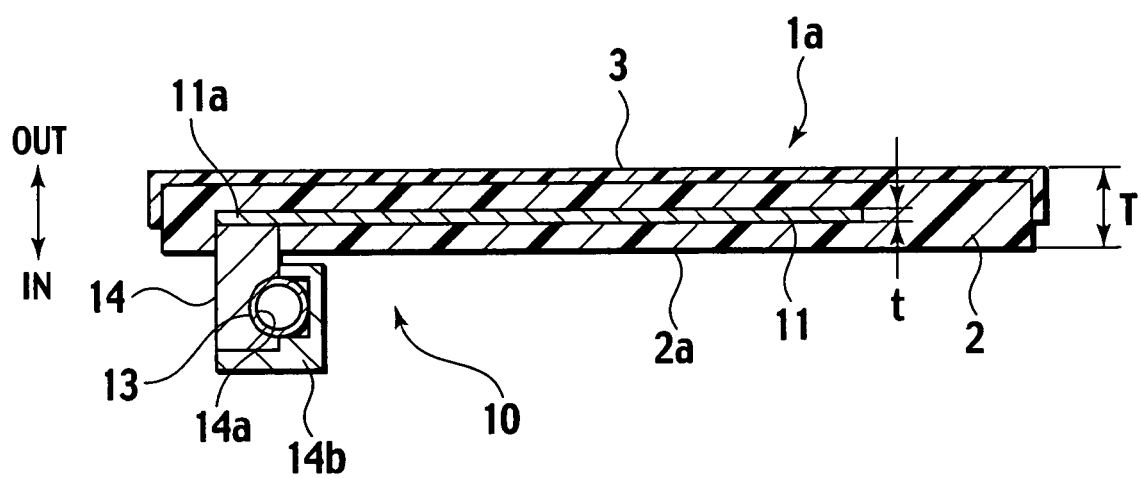
FIG. 4 is a sectional view taken along the line IV-IV of FIGS. 2 and 10.

As shown in FIG. 4, the heat conducting plate 11 is insert-molded into the baseboard 2 of the instrument panel 1 upon injection molding thereof.

The heat conducting plate 11 is insert-molded into the baseboard 2 so as to be embedded therewith.

When insert-molding the heat conducting plate 11 into the baseboard 2, the heat conducting plate 11 is provided with a plurality of brackets 14 each protruding inward from the inner surface 2a of the baseboard 2. The heat pipe 13 is connected in heat-conductive relationship to the heat conducting plate 11 by those brackets 14.

As shown in FIG. 4, the brackets 14 are integrally formed with the heat conducting plate 11 to protrude therefrom, using the same material as that of the heat conducting plate 11 or the material having similar heat conductivity thereto. The heat conducting plate 11 is insert-molded with those brackets 14 left protruded from the forming die of the baseboard 2.

The bracket 14 is formed to have on its lower end a semicircular recess portion 14a which accommodates the cylindrical heat pipe 13 as shown in FIG. 4. The heat pipe 13 is fit in the recess portion 14a, and the outer side thereof is covered with a holder 14b so as to be detachably fixed to the bracket 14.

The brackets 14 are arranged along the length of an edge portion 11a of the heat conducting plate 11. Being fit with the respective brackets 14, the heat pipe 13 is disposed along the edge portion 11a of the heat conducting plate 11. In this state, the heat pipe 13 is connected to the heat conducting plate 11 through the respective brackets 14 at a plurality of connecting points.

The heat conducting plate 11 may be formed of a material that exhibits good thermal conductance, for example, copper, aluminum, iron, carbon fiber, or a composite material thereof. The thickness t of the heat conducting plate 11 is set to 0.1 mm or larger, and the ratio of the thickness t to the whole thickness T including those of the baseboard 2, the skin material 3, and the heat conducting plate 11 is set to be 70% or lower.

The heat conducting plate 11 of the vehicle heat-removing device 10 is press-formed into a shape of the instrument panel 1. Each of the brackets 14 is separately made and fixed to the heat conducting plate 11 to support the heat pipe 13 thereon. The heat conducting plate 11 is set in the forming die, together with the brackets 14, for injection molding so as to be insert-molded. The frame of the instrument panel 1 having a combination of the heat conducting plate 11 and the baseboard 2 is thus produced.

The frame of the instrument panel 1 is set in a forming die of an injection molding for forming the skin material 3 adhered on the frame, to thereby form the instrument panel 1 according to the embodiment.

After installing the instrument panel 1 to the vehicle M in the assembly process of the vehicle M, one end of the heat pipe 13 is joined to the brackets 14 of the heat conducting plate 11. Then the other end of the heat pipe 13 is joined to the heat sink 12 provided outside of the vehicle passenger compartment 20 so as to form the desired vehicle heat-removing device 10.

According to the vehicle heat-removing device 10 and the heat-removing method of the vehicle interior part of the embodiment, the top board 1a of the instrument panel is provided with the heat conducting plate 11 which serves to collect the heat accumulated on the skin material 3. The heat pipe 13 is connected in heat-conductive relationship to the heat conducting plate 11 such that the heat accumulated on the skin material 3 is transferred to the heat pump 12 via the heat conducting plate 11. In this case, the heat conducting plate 11 is disposed on the inner side of the skin material 3 and inside in the baseboard thickness direction of the inner surface 2a thereof, that is, inside of the baseboard 2. Accordingly, it is possible to efficiently transfer the heat accumulated on the skin material 3 to the heat conducting plate 11, and further to the heat pipe 13 through the brackets 14.

The vehicle heat-removing device 10 of the embodiment, thus, allows the heat accumulated on the skin material 3 to be efficiently transferred to the heat conducting plate 11. Then the heat collected by the heat conducting plate 11 is transferred to the heat pipe 13 to be released to the outside from the heat sink 12. The cooling efficiency of the high-thermal-capacity instrument panel 1 is thus enhanced, effectively restraining an increase in temperature of the passenger compartment 20 of the vehicle M that has been left parked in a place subject to direct sunlight for a certain period of time.

In this embodiment, upon injection molding of the baseboard 2 of the instrument panel 1, the heat conducting plate 11 is insert-molded into the baseboard 2. This makes it possible to simplify the assembling operation of the heat conducting plate 11. As the heat conducting plate 11 is embedded in the baseboard 2, that is, covered with the resin as the material of the baseboard 2, the heat collected by the heat conducting plate 11 may be efficiently transferred to the heat pipe 13 without leaking to the vehicle passenger compartment 20.

The heat conducting plate 11 is provided with a plurality of brackets 14 each protruding inward from the inner surface 2a of the baseboard 2. The heat pipe 13 is connected in heat-conductive relationship to the heat conducting plate 11 by these brackets 14. Accordingly, it is possible to connect the heat pipe 13 to the brackets 14 in a post process. The heat pipe 13 and the baseboard 2 including the heat conducting plate 11 may be separately made and installed to the vehicle M in the vehicle assembly process, thus simplifying the installation of the vehicle heat-removing device 10.

The heat pipe 13 is provided along the edge portion 11a of the heat conducting plate 11 so as to be connected thereto through the plurality of brackets 14 at the plurality of connecting points. As a result, the temperature gradient is generated in the heat conducting plate 11 between its edge at which the heat pipe 13 is provided and the other edge at which the heat pipe 13 is not provided. Transfer of the heat from the heat conducting plate 11 to the heat pipe 13, thus, is promoted. This makes it possible to enhance the efficiency in the heat transfer to the heat pipe 13.

The heat conducting plate 11 of the embodiment is formed of a material with good thermal conductance, for example, copper, aluminum, iron, carbon fiber, or a composite material thereof. The heat accumulated on a part of the skin material 3 can be substantially uniformly conducted to all over the heat conducting plate 11. This makes it possible to increase the amount of heat transferred from the skin material 3 to the heat pipe 13 via the heat conducting plate 11.

The thickness t of the heat conducting plate 11 is set to 0.1 mm or larger, whereby moldability is kept good while maintaining its thickness above the minimum requirement, and the heat from the skin material 3 may be efficiently obtained and transferred to the heat pipe 13. The ratio of the thickness t to the total thickness T including those of the baseboard 2, skin material 3 and the heat conducting plate 11 is set to be 70% or lower. This makes it possible to easily perform the insert-molding of the heat conducting plate 11 into the instrument panel 1 having complicated curved face, bent face and the like. The cost for the technique or facility to cope with such molding operation, thus, can be kept low.

Figure 16:
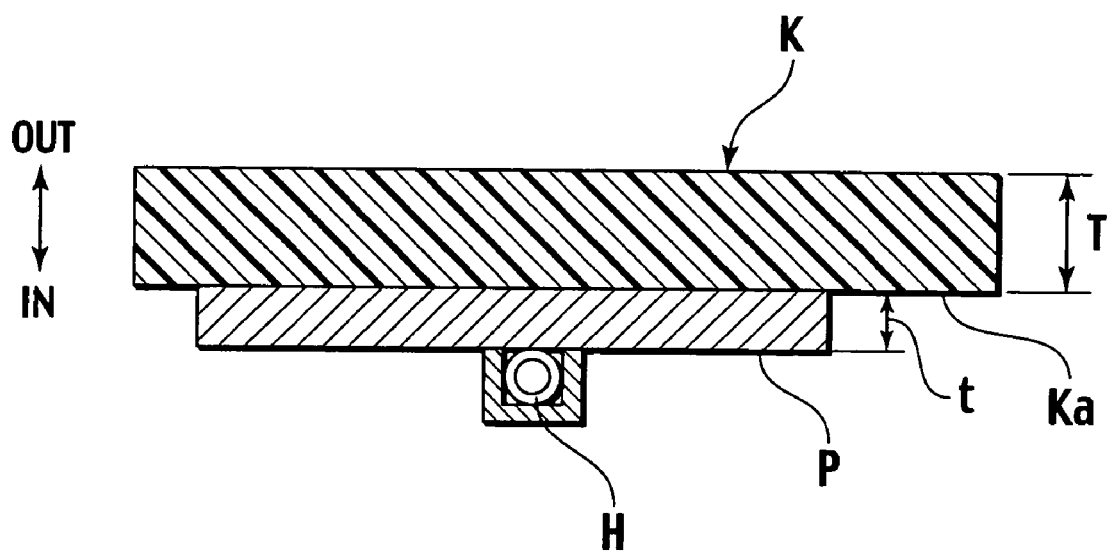
FIG. 16 is a sectional view of the comparative example.

FIG. 5 is a table which shows the heat-removing effect obtained from the vehicle heat-removing device 10 of the embodiment with respect to the data of the air temperature outside of and close to the instrument panel 1, the surface temperature, and the inner air temperature inside of the instrument panel 1 in comparison with those of the comparative example shown in FIG. 16.

In the comparative example shown in FIG. 16, the heat conducting plate P for collecting heat is attached to the inner surface Ka of the instrument panel K, and the heat pipe H is attached directly to the inner surface of the heat conducting plate P. Likewise the embodiment, the comparative example employs a linear/straight heat pipe.

In order to make the conditions of the embodiment and the comparative example the same, the skin material has a surface formed of a thermoplastic resin material. In the experiment, the vehicle is left parked under the direct sunlight in summer at an amount of solar radiation of 850 W/m$^2$ at the maximum and average outside air temperature of 32° C.

The measurement was performed from 9:00 A.M. to 3:00 P.M. to record the temperature of the respective parts continuously and to make a comparison in the time zone at which the temperature becomes the highest.

Referring to the comparative example as shown in FIG. 5, the air temperature outside of and close to the instrument panel measured 70° C., the surface temperature measured 75° C., and the inner air temperature measured 75° C. In cases 1 and 2 of the embodiments, each of the air temperatures outside of and close to the instrument panel measured 54° C. and 58° C., the surface temperatures measured 57° C. and 63° C., and the inner air temperature measured 54° C. and 52° C., respectively. This indicates the considerable temperature decrease derived from the vehicle heat-removing device 10 of the embodiment.

Second Embodiment

Figure 6:
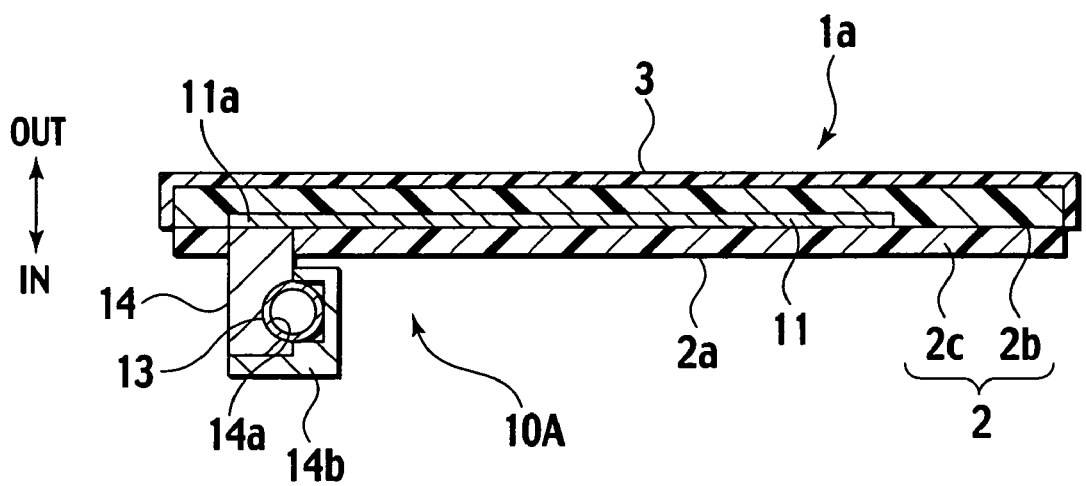
FIG. 6 is a sectional view showing second and sixth embodiments of the present invention corresponding to FIG. 4.

FIG. 6 represents a second embodiment of the invention in which the same components as those of the first embodiment are designated as the same reference numerals. The description of those components, thus, will be omitted.

Basically a vehicle heat-removing device 10A has substantially the same structure as that of the first embodiment, and is provided with a heat conducting plate 11 for collecting the heat accumulated on a skin material 3, and a heat pipe 13 provided on an inner side of an inner surface 2a of a baseboard 2 and connected in heat-conductive relationship to the heat conducting plate 11 so as to transfer the heat of the skin material 3 collected by the heat conducting plate 11 to a heat sink 12 (see FIG. 1).

In the second embodiment, the baseboard 2 is formed of an upper portion and a lower portion, that is, an outer baseboard 2b and an inner baseboard 2c, respectively. The heat conducting plate 11 is insert-molded into the inner surface of the outer baseboard 2b so as to be interposed between the outer baseboard 2b and the inner baseboard 2c.

In this embodiment, a plurality of brackets 14 each protruding downward from the inner baseboard 2c are attached to the heat conducting plate 11 so as to be connected to the linear/straight heat pipe 13.

Likewise the first embodiment, the heat conducting plate 11 in this embodiment has its thickness t equal to or larger than 0.1 mm, and preferably the ratio of the thickness t to the total thickness T including those of the baseboard 2, the skin material 3, and the heat conducting plate 11 is set to be 70% or lower.

Accordingly the second embodiment provides the same effects as those of the first embodiment. In this embodiment, the heat conducting plate 11 is interposed between the outer baseboard 2b and the inner baseboard 2c so as to transfer the heat collected by the heat conducting plate 11 efficiently to the heat pipe 13 without causing leakage of the heat to the vehicle passenger compartment 20.

Third Embodiment

Figure 7:
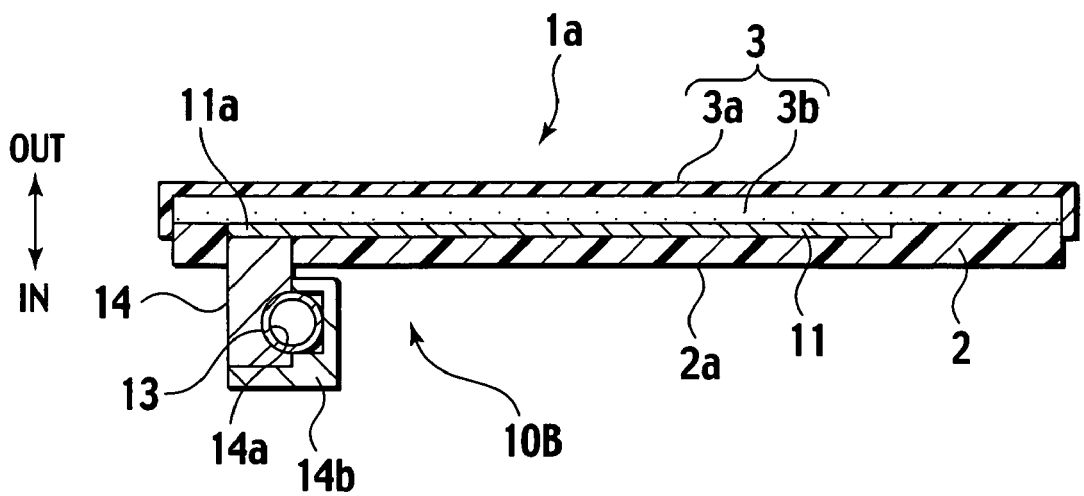
FIG. 7 is a sectional view showing third and seventh embodiments of the present invention corresponding to FIG. 4.

FIG. 7 represents a third embodiment of the present invention in which the same components as those of the first and the second embodiments are designated as the same reference numerals. The description of those components, thus, will be omitted.

Basically a vehicle heat-removing device 10B has substantially the same structure as that of the first embodiment, and is provided with a heat conducting plate 11 for collecting the heat accumulated on a skin material 3, and a heat pipe 13 provided on an inner side of an inner surface 2a of a baseboard 2 and connected in heat-conductive relationship to the heat conducting plate 11 so as to transfer the heat of the skin material 3 collected by the heat conducting plate 11 to a heat sink 12 (see FIG. 1).

In this embodiment, the skin material 3 is formed of a skin surface material 3a and a soft pad 3b on the inner side thereof. The soft pad 3b is formed of open-cell foam of polyethylene foam, polyurethane foam and the like.

The thickness of the baseboard 2 is reduced by the amount substantially equal to the thickness of the soft pad 3b. The heat conducting plate 11 is insert-molded into the upper surface of the baseboard 2 having the reduced thickness, and is brought into direct surface contact with the soft pad 3b.

The heat conducting plate 11 is provided with a plurality of brackets 14 each protruding downward from the inner surface 2a of the baseboard 2 so as to be connected to the linear/straight heat pipe 13.

In this embodiment provided with the soft pad 3b, the heat conducting plate 11 has its thickness t equal to or larger than 0.1 mm, and preferably the ratio of the thickness t to the total thickness T including those of the baseboard 2, the skin material 3, and the heat conducting plate 11 is set to be 70% or lower.

Accordingly the second embodiment provides the same effects as those of the first embodiment. In this embodiment, the heat conducting plate 11 is interposed between the baseboard 2 and the soft pad 3b of the skin material 3. This makes it possible to efficiently transfer the heat collected by the heat conducting plate 11 to the heat pipe 13 without causing leakage of the heat to the vehicle passenger compartment 20.

In this embodiment, the skin material 3 is formed of the skin surface material 3a and the soft pad 3b that is interposed between the skin surface material 3a and the heat conducting plate 11. The soft pad 3b is formed of the open-cell foam allowing air circulating therein. The resultant natural convection within the foam makes it possible to reduce the insulation property of the heat conducting path from the skin surface material 3a to the heat conducting plate 11, thus efficiently allowing the heat conducting plate 11 to collect the heat accumulated on the skin material 3.

Fourth Embodiment

Figure 8:
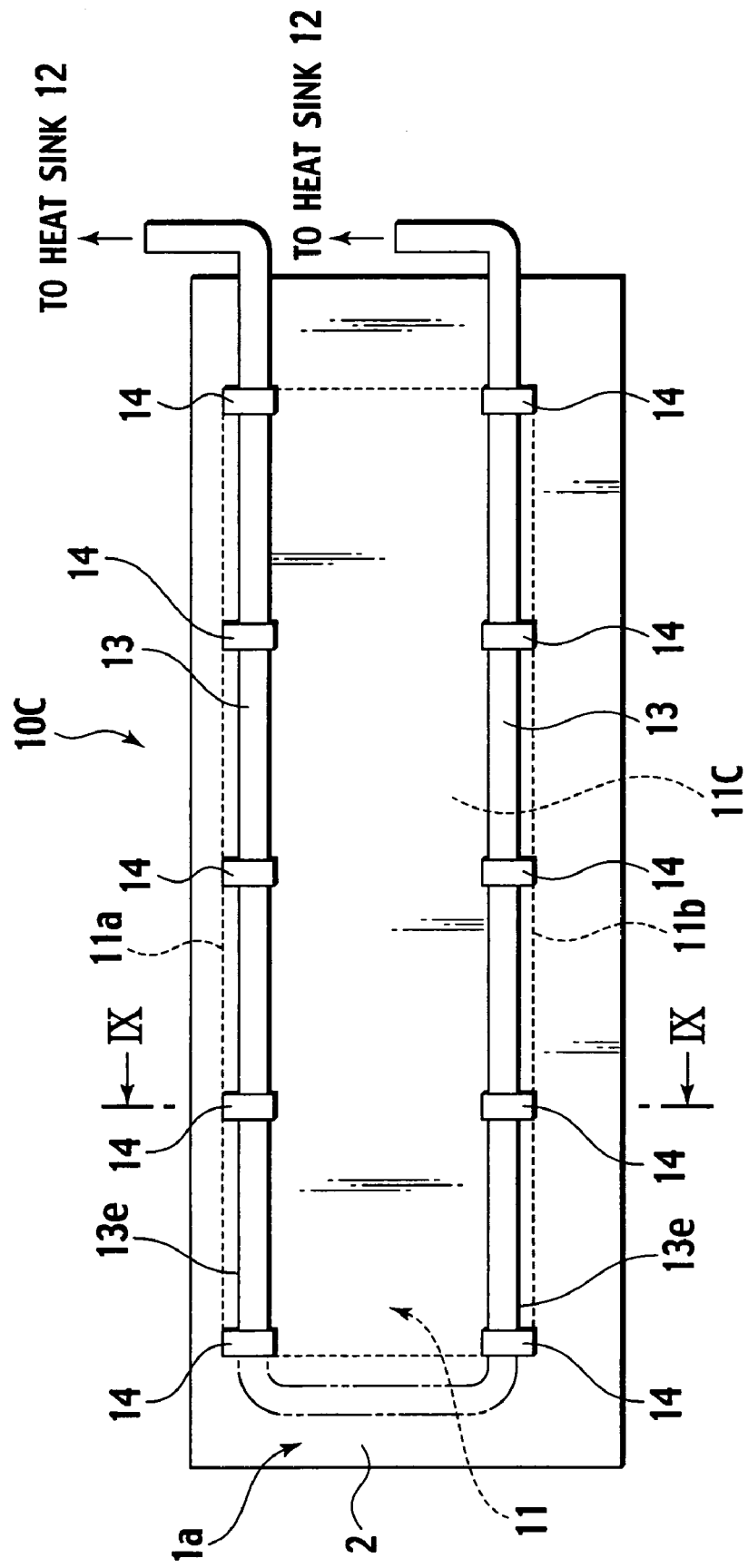
FIG. 8 is an enlarged bottom view of an essential portion of an instrument panel to which a heat-removing device for a vehicle according to a fourth embodiment of the present invention is installed.
Figure 9:
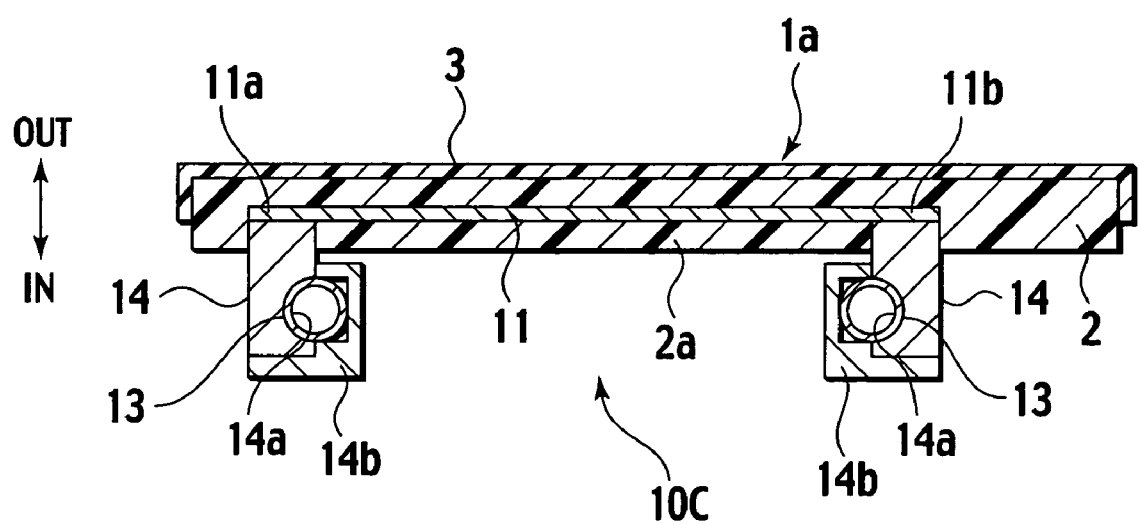
FIG. 9 is a sectional view taken along the line IX-IX of FIG. 8.

FIGS. 8 and 9 represent a fourth embodiment of the invention in which the same components as those of the first embodiment are designated as the same reference numerals. The description of those components, thus, will be omitted.

Referring to FIGS. 8 and 9, basically a vehicle heat-removing device 10C has substantially the same structure as that of the first embodiment, and is provided with a heat conducting plate 11 disposed on the inner side (lower side in the drawing) of the skin material 3 and inside in the baseboard thickness direction (upper side in the drawing) of the inner surface 2a of the baseboard 2 for collecting the heat accumulated on a skin material 3, and a heat pipe 13 provided on an inner side of the inner surface 2a of the baseboard 2 and connected in heat-conductive relationship to the heat conducting plate 11 so as to transfer the heat of the skin material 3 collected by the heat conducting plate 11 to a heat sink.

The vehicle heat-removing device 10C of the embodiment has two units of heat pipes 13, 13 as indicated by the solid line each extending along the respective edge portions 11a, 11b of the heat conducting plate 11.

Each of the heat pipes 13 in this embodiment is connected to a plurality of brackets 14 each protruding downward from the baseboard 2. The respective brackets 14 connected to the linear/straight heat pipes 13 are arranged along both edge portions 11a, 11b of the heat conducting plate 11.

In this embodiment, as shown in FIG. 9, the heat conducting plate 11 is insert-molded into the baseboard 2 of the instrument panel 1 upon injection molding thereof. The process for forming the heat conducting plate 11 is not limited to the one as described above. As in the second embodiment shown in FIG. 6, the baseboard 2 may be formed of the outer baseboard 2b and the inner baseboard 2c so as to interpose the heat conducting plate 11 therebetween. As in the third embodiment shown in FIG. 7, the skin material 3 may be formed of the skin surface material 3a and the soft pad 3b of the open-cell foam such that the heat conducting plate 11 is interposed between the baseboard 2 and the soft pad 3b.

Accordingly the vehicle heat-removing device 10C of the embodiment provides the same effects as those of the first embodiment. In this embodiment, two heat pipes 13, 13 are extended along both edge portions 11a, 11b of the heat conducting plate 11. As each temperature of the edge portions 11a, 11b of the heat conducting plate 11 decreases, the temperature gradient generated therein between the edge portions 11a, 11b and the intermediate portion 11C of the heat conducting plate 11 becomes large whereby the heat transfer from the heat conducting plate 11 to the heat pipe 13 is promoted. In this case, even if only a part of the surface of the top board 1a of the instrument panel 1 is exposed to the sunlight, heat flows toward an end portion with sufficient heat transfer capacity. This allows the temperature of the entire surface of the top board 1a of the instrument panel 1 to be uniformly reduced.

In this embodiment, the vehicle heat-removing device 10C is provided with two parallel heat pipes 13, 13 as indicated by the solid line of FIG. 8. It may be structured such that each end portion 13e of the heat pipes 13, 13 may be joined together so as to be communicated for forming a loop heat pipe.

Fifth Embodiment

Figure 10:
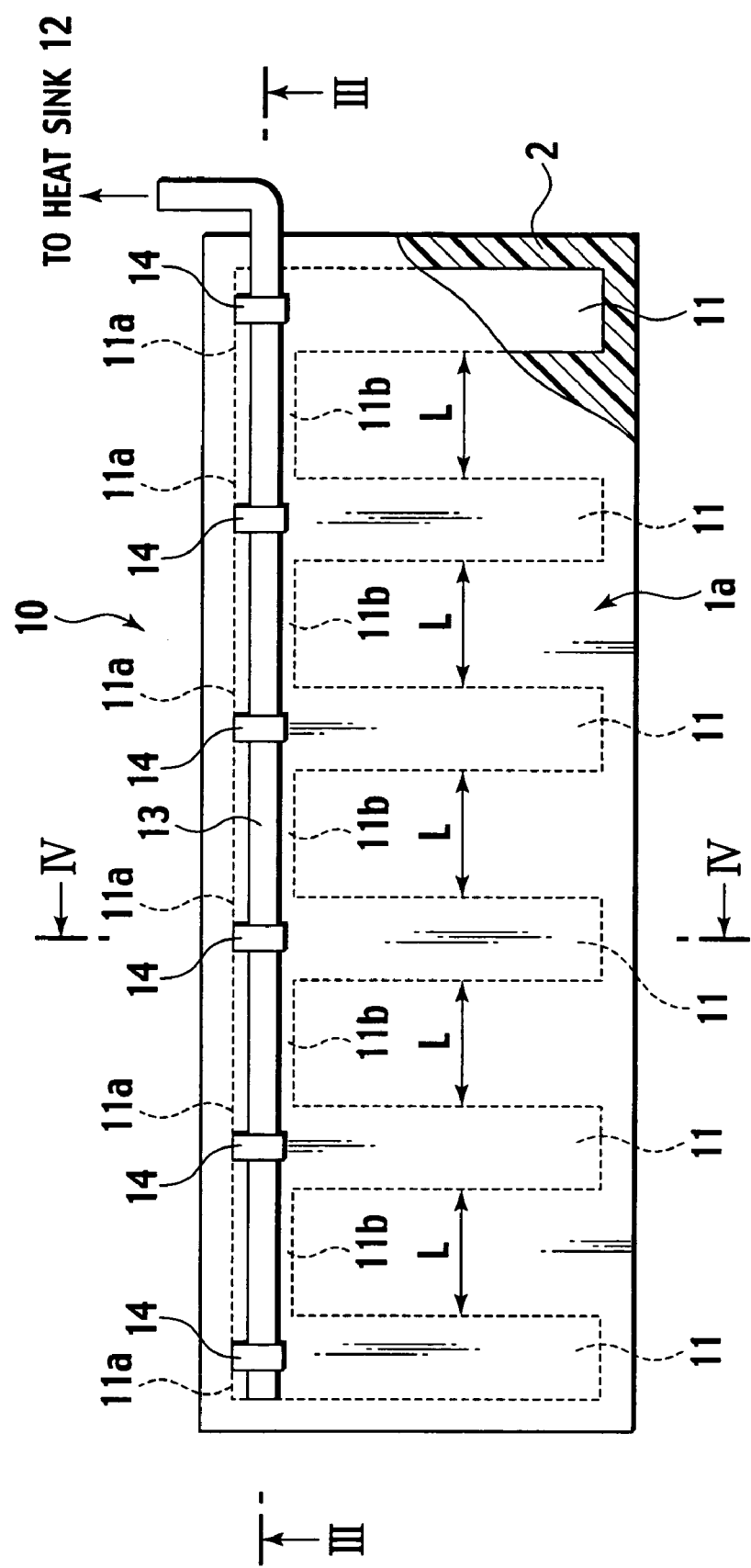
FIG. 10 is an enlarged bottom view of an essential portion of an instrument panel to which a heat-removing device for a vehicle according to a fifth embodiment of the present invention is installed.

FIGS. 3 and 10 represent a fifth embodiment of the invention.

Referring to FIGS. 3 and 10, a vehicle heat-removing device 10 is provided with a plurality of heat conducting plates 11 for collecting heat accumulated on the skin material 3 receiving direct sunlight, and a heat pipe 13. The heat conducting plates 11 are provided at predetermined intervals L in the longitudinal direction (the vehicle width direction) of the instrument panel 1 on the inner side of the skin material 3 (lower side in FIG. 3) and inside in the baseboard thickness direction (upper side in FIG. 3) of the inner surface 2a of the baseboard 2, that is, inside of the baseboard 2. The heat pipe 13 is provided on the inner side of the inner surface 2a of the baseboard 2 so as to be connected in heat-conductive relationship to the plurality of heat conducting plates 11 for transferring the heat of the skin material 3 that has been collected by the respective heat conducting plates 11 to a heat sink 12 (see FIG. 1) serving as a heat-releasing device.

In this embodiment, the plurality of heat conducting plates 11 are provided at predetermined intervals L in the longitudinal direction of the instrument panel 1 on the inner side of the skin material 3 and inside in the baseboard thickness direction of the inner surface 2a of the baseboard 2 such that the heat conducting plates 11 collect the heat of the direct sunlight accumulated on the skin material 3, and the heat of the skin material 3 collected by the heat conducting plates 11 is transferred through the heat pipe 13 to a heat sink 12 for releasing heat of the instrument panel 1.

The heat pipe 13 is a well-known device to transfer heat of a specific portion to the other portion using latent heat resultant from evaporation and condensation of liquid. Typical heat pipe has a hollow tubular structure in which a liquid such as water and alcohol is sealed in. The sealed liquid is evaporated at an end of the heat pipe, receiving heat transferred to the end of the heat pipe, and is condensed and liquefied at the other end of the heat pipe while releasing heat to the heat sink. The resultant liquid is re-circulated to the opposite end again. The aforementioned cycle constitutes the basic structure of the heat pipe 13. However, various types of heat pipe using the aforementioned basic structure may be employed in this embodiment.

In this embodiment, the heat pipe 13 is formed as a linear/straight heat pipe having its portion disposed on the heat conducting plates 11 linearly formed.

The heat sink 12 is located on a position to be exposed to the air outside of the passenger compartment 20, for example, on a body panel, a chassis, or a lower surface of a floor panel.

The plurality of heat conducting plates 11 has edge portions 11a connected one another by connecting portions 11b so as to collectively form a comb-like shape as shown in FIG. 10. The heat conducting plates 11 are insert-molded into the baseboard 2 of the instrument panel 1 upon injection molding thereof as shown in FIG. 4.

The heat conducting plates 11 are insert-molded into the baseboard 2 so as to be embedded therewith.

Upon insert-molding of the plurality of heat conducting plates 11 into the baseboard 2, a plurality of brackets 14 each protruding inward from the inner surface 2a of the baseboard 2 are provided, through which the heat pipe 13 is connected in heat-conductive relationship to the heat conducting plates 11.

As shown in FIG. 4, the brackets 14 are integrally formed with the heat conducting plates 11 to protrude therefrom, using the same material as that of the heat conducting plates 11 or the material having similar heat conductivity thereto. The heat conducting plates 11 are insert-molded with those brackets 14 left protruded from the forming die of the baseboard 2.

The bracket 14 is formed to have on its lower end a semicircular recess portion 14a which accommodates the cylindrical heat pipe 13 as shown in FIG. 4. The heat pipe 13 is fit in the recess portion 14a, and the outer side thereof is covered with a holder 14b so as to be detachably fixed to the bracket 14.

The brackets 14 are arranged along the edge portions 11a of the respective heat conducting plates 11. The brackets 14 are arranged along the edge portions 11a of the heat conducting plates 11 to be fit with the heat pipe 13. In this state, the heat pipe 13 is connected to the heat conducting plates 11 by the brackets 14 at a plurality of connecting points.

The heat conducting plates 11 may be formed of a material that exhibits good thermal conductance, for example, copper, aluminum, iron, carbon fiber, or a composite material thereof. The thickness t of the heat conducting plates 11 is set to 0.1 mm or larger, and the ratio of the thickness t to the whole thickness T including those of the baseboard 2, the skin material 3, and the heat conducting plate 11 is set to be 70% or lower.

The total area of the plurality of heat conducting plates 11 are set to be in the range between 20% and 80% of the area of the top board 1a of the instrument panel 1, which is exposed to the direct sunlight.

In the vehicle heat-removing device 10 of the embodiment, the respective heat conducting plates 11 are press molded in a shape of the instrument panel 1. Each of the brackets 14 on which the heat pipe 13 is supported is separately made and fixed to the heat conducting plates 11. The resultant heat conducting plates 11 with the brackets 14 are set in the forming die for injection molding of the baseboard 2 so as to be insert-molded therein. The frame of the instrument panel 1 having the baseboard 2 combined with the heat conducting plates 11 is thus produced.

The frame of the instrument panel 1 is set in the forming die for the injection molding for forming the skin material 3 adhered on the frame, to thereby form the instrument panel 1 according to the embodiment.

After installing the instrument panel 1 to the vehicle M in the assembly process of the vehicle M, one end of the heat pipe 13 is joined to the brackets 14 of the heat conducting plate 11. Then the other end of the heat pipe 13 is joined to the heat sink 12 provided outside of the vehicle passenger compartment 20 so as to form the desired vehicle heat-removing device 10.

According to the vehicle heat-removing device 10 and the heat-removing method of the vehicle interior part of the embodiment, the top board 1a of the instrument panel is provided with the heat conducting plates 11 which serve to collect the heat accumulated on the skin material 3. The heat pipe 13 is connected in heat-conductive relationship to the heat conducting plates 11 such that the heat accumulated on the skin material 3 is transferred to the heat pump 12 via the heat conducting plates 11. In this case, the heat conducting plates 11 are disposed on the inner side of the skin material 3 and inside in the baseboard thickness direction of the inner surface 2a thereof, that is, inside of the baseboard 2. Accordingly, it is possible to efficiently transfer the heat accumulated on the skin material 3 to the heat conducting plates 11, and further to the heat pipe 13 through the brackets 14.

The vehicle heat-removing device 10 of the embodiment, thus, allows the heat accumulated on the skin material 3 to be efficiently transferred to the heat conducting plates 11. Then the heat collected by the heat conducting plates 11 are transferred to the heat pipe 13 to be released to the outside from the heat sink 12. The cooling efficiency of the high-thermal-capacity instrument panel 1 is thus enhanced, effectively restraining an increase in temperature of the passenger compartment 20 of the vehicle M that has been left parked in a place subject to direct sunlight for a certain period of time.

The plurality of heat conducting plates 11 are provided at predetermined intervals in the longitudinal direction of the instrument panel 1. Even if the instrument panel 1 has a complicated configuration including a curved portion, a bent portion and the like, the heat conducting plates 11 can be formed into the heat conducting plates 11. Accordingly the instrument panel 1 can be formed into a desired shape without sacrificing the moldability of the baseboard 2.

In this embodiment, upon injection molding of the baseboard 2 of the instrument panel 1, the heat conducting plates 11 are insert-molded into the baseboard 2. This makes it possible to simplify the assembling operation of the heat conducting plates 11. As the heat conducting plates 11 are embedded in the baseboard 2, that is, covered with the resin as the material of the baseboard 2, the heat collected by the heat conducting plates 11 may be efficiently transferred to the heat pipe 13 without leaking to the vehicle passenger compartment 20.

The heat conducting plates 11 are provided with a plurality of brackets 14 each protruding inward from the inner surface 2a of the baseboard 2. The heat pipe 13 is connected in heat-conductive relationship to the heat conducting plates 11 by these brackets 14. Accordingly, it is possible to connect the heat pipe 13 to the brackets 14 in a post process. The heat pipe 13 and the baseboard 2 including the heat conducting plates 11 may be separately made and installed to the vehicle M in the vehicle assembly process, thus simplifying the installation of the vehicle heat-removing device 10.

The heat pipe 13 is disposed along the edge portions 11a of the respective heat conducting plates 11 so as to be connected thereto through the brackets 14. The temperature gradient in the heat conducting plates 11 may be generated between the edge side at which the heat pipe 13 is connected and the opposite edge side at which no heat pipe 13 is connected. Then flow of the heat from the heat conducting plates 11 toward the heat pipe 13 is promoted, thus further enhancing the efficiency of the heat transfer to the heat pipe 13.

The heat conducting plates 11 of the embodiment are formed of a material with good thermal conductance, for example, copper, aluminum, iron, carbon fiber, or a composite material thereof. The heat accumulated on a part of the skin material 3 can be substantially uniformly conducted to all over the heat conducting plates 11. This makes it possible to increase the amount of heat transferred from the skin material 3 to the heat pipe 13 via the heat conducting plates 11.

The thickness t of the heat conducting plates 11 is set to 0.1 mm or larger, whereby moldability is kept good while maintaining its thickness above the minimum requirement, and the heat from the skin material 3 may be efficiently obtained and transferred to the heat pipe 13. The ratio of the thickness t to the total thickness T including those of the baseboard 2, skin material 3 and the heat conducting plate 11 is set to be 70% or lower. This makes it possible to easily perform the insert-molding of the heat conducting plates 11 into the instrument panel 1 having complicated curved face, bent face and the like. The cost for the technique or facility to cope with such molding operation, thus, can be kept low.

The heat conducting plates 11 do not have to be provided to cover all the portions that require the heat transfer, as long as the ratio of the area of the heat conducting plates 11 to the area of the top board 1a of the instrument panel exposed to direct sunlight satisfies the required level. In this embodiment, the total area of the plurality of heat conducting plates 11 is set to be within the rage between 20% and 80% of the area of the top board 1a of the instrument panel 1 exposed to the direct sunlight, which provide the required heat-removing function.

Sixth Embodiment

FIG. 6 represents a sixth embodiment of the invention in which the same components as those of the fifth embodiment are designated as the same reference numerals. The description of those components, thus, will be omitted.

Basically a vehicle heat-removing device 10A has substantially the same structure as that of the fifth embodiment, and is provided with heat conducting plates 11 for collecting the heat accumulated on a skin material 3, and a heat pipe 13 provided on an inner side of an inner surface 2a of a baseboard 2 and connected in heat-conductive relationship to the heat conducting plates 11 so as to transfer the heat of the skin material 3 collected by the heat conducting plates 11 to a heat sink 12 (see FIG. 1).

In the sixth embodiment, the baseboard 2 is formed of an upper portion and a lower portion, that is, an outer baseboard 2b and an inner baseboard 2c, respectively. The heat conducting plates 11 are insert-molded into the inner surface of the outer baseboard 2b so as to be interposed between the outer baseboard 2b and the inner baseboard 2c.

In this embodiment, a plurality of brackets 14 each protruding downward from the inner baseboard 2c are attached to the heat conducting plates 11 so as to be connected to the linear/straight heat pipe 13.

Likewise the fifth embodiment, each of the heat conducting plates 11 in this embodiment has its thickness t equal to or larger than 0.1 mm, and preferably the ratio of the thickness t to the total thickness T including those of the baseboard 2, the skin material 3, and the heat conducting plate 11 is set to be 70% or lower.

Accordingly the sixth embodiment provides the same effects as those of the fifth embodiment. In this embodiment, the heat conducting plates 11 are interposed between the outer baseboard 2b and the inner baseboard 2c so as to transfer the heat collected by the heat conducting plates 11 efficiently to the heat pipe 13 without causing leakage of the heat to the vehicle passenger compartment 20.

Seventh Embodiment

FIG. 7 represents a seventh embodiment of the present invention in which the same components as those of the fifth and the sixth embodiments are designated as the same reference numerals. The description of those components, thus, will be omitted.

Basically a vehicle heat-removing device 10B has substantially the same structure as that of the fifth embodiment, and is provided with heat conducting plates 11 for collecting the heat accumulated on a skin material 3 as shown in FIG. 7, and a heat pipe 13 provided on an inner side of an inner surface 2a of a baseboard 2 and connected in heat-conductive relationship to the heat conducting plates 11 so as to transfer the heat of the skin material 3 collected by the heat conducting plates 11 to a heat sink 12 (see FIG. 1).

In this embodiment, the skin material 3 is formed of a skin surface material 3a and a soft pad 3b on the inner side thereof. The soft pad 3b is formed of open-cell foam of polyethylene foam, polyurethane foam and the like.

The thickness of the baseboard 2 is reduced by the amount substantially equal to the thickness of the soft pad 3b. The heat conducting plates 11 are insert-molded into the upper surface of the baseboard 2 having the reduced thickness, and is brought into direct surface contact with the soft pad 3b.

The heat conducting plates 11 are provided with a plurality of brackets 14 each protruding downward from the inner surface 2a of the baseboard 2 so as to be connected to the linear/straight heat pipe 13.

In this embodiment provided with the soft pad 3b, each of the heat conducting plates 11 has its thickness t equal to or larger than 0.1 mm, and preferably the ratio of the thickness t to the total thickness T including those of the baseboard 2, the skin material 3, and the heat conducting plate 11 is set to be 70% or lower.

Accordingly the seventh embodiment provides the same effects as those of the fifth embodiment. In this embodiment, the heat conducting plates 11 are interposed between the baseboard 2 and the soft pad 3b of the skin material 3. This makes it possible to efficiently transfer the heat collected by the heat conducting plates 11 to the heat pipe 13 without causing leakage of the heat to the vehicle passenger compartment 20.

In this embodiment, the skin material 3 is formed of the skin surface material 3a and the soft pad 3b that is interposed between the skin surface material 3a and the heat conducting plates 11. The soft pad 3b is formed of the open-cell foam allowing air circulating therein. The resultant natural convection within the foam makes it possible to reduce the insulation property of the heat conducting path from the skin surface material 3a to the heat conducting plates 11, thus efficiently allowing the heat conducting plates 11 to collect the heat accumulated on the skin material 3.

Eighth Embodiment

Figure 11:
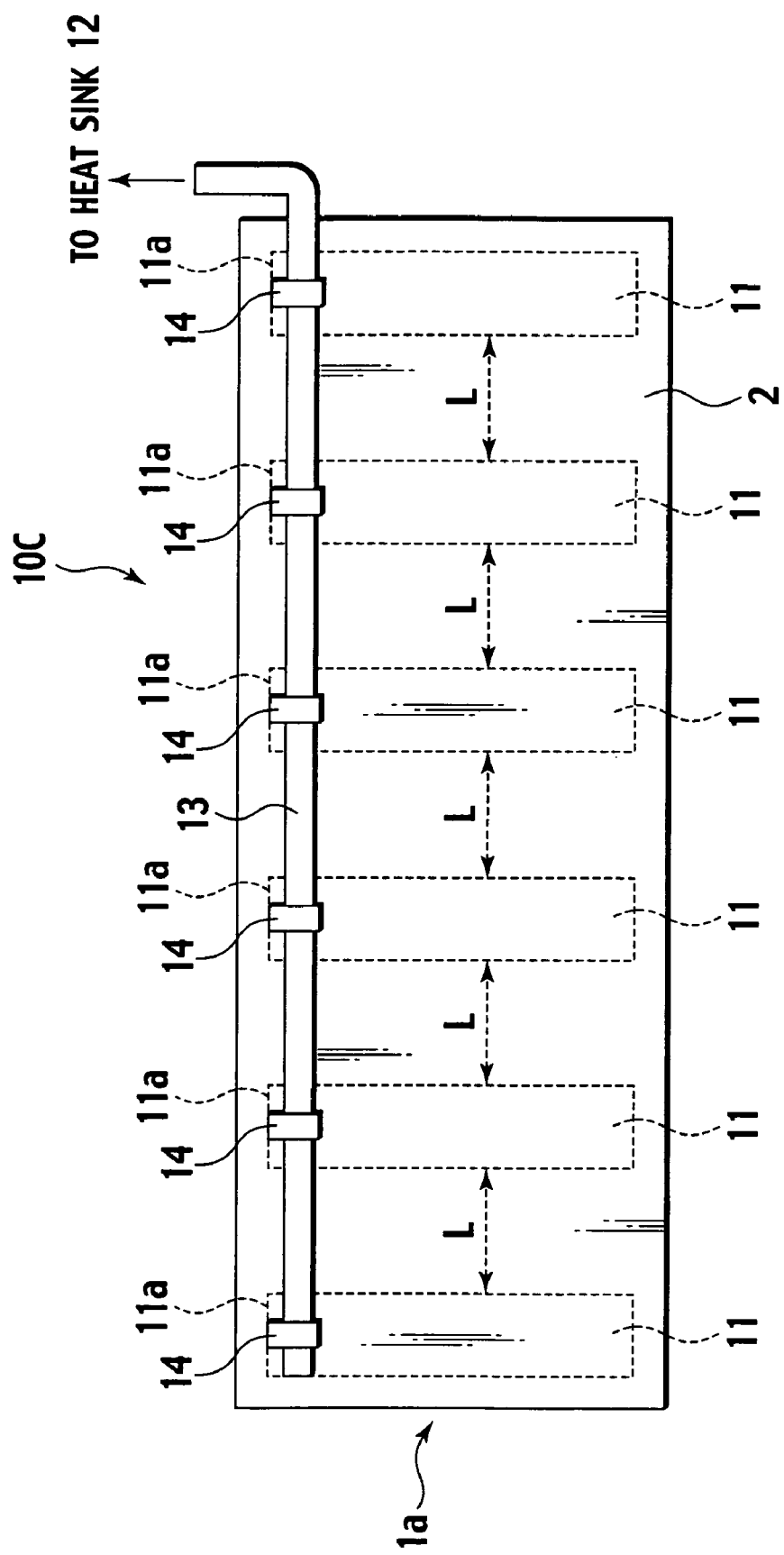
FIG. 11 is a bottom view of an essential portion of an instrument panel to which a heat-removing device for a vehicle according to an eighth embodiment of the present invention is installed.

FIG. 11 represents an eighth embodiment of the invention, in which the same components as those of the fifth embodiment are designated as the same reference numerals. The description of those components, thus, will be omitted.

As shown in FIG. 11, basically a vehicle heat-removing device 10C of the embodiment has substantially the same structure as that of the fifth embodiment, and is provided with a plurality of heat conducting plates 11 on the inner side of the skin material 3 and inside in the baseboard thickness direction of the inner surface 2a of the baseboard 2.

Referring to FIG. 11, the vehicle heat-removing device 10C is different from the vehicle heat-removing device 10 of the fifth embodiment in that each of the plurality of sheet-like heat conducting plates 11 is separately provided without being connected at the edge portions 11a thereof.

In the case where the heat conducting plates 11 are separately provided, the brackets 14 are disposed along the edge portions 11a of the heat conducting plates 11 such that the heat pipe 13 is connected in heat-conductive relationship to the heat conducting plates 11 by the brackets 14.

In this embodiment, likewise the fifth embodiment (see FIG. 4), the heat conducting plates 11 may be insert-molded into the baseboard 2 of the instrument panel 1 upon injection molding thereof. Also likewise the sixth embodiment (see FIG. 6), the baseboard 2 may be formed of the outer baseboard 2b and the inner baseboard 2c interposing the heat conducting plates 11 therebetween. As described in the third embodiment (see FIG. 7), the skin material 3 may be formed of a skin surface material 3a and a soft pad 3b of the open-cell foam such that the heat conducting plates 11 are interposed between the baseboard 2 and the soft pad 3b.

In this embodiment, preferably the total area of the plurality of heat conducting plates 11 is set to be in the range between 20% and 80% of the area of the top board 1a of the instrument panel 1 receiving the direct sunlight.

The embodiment, thus, can provide the similar effects to those of the fifth embodiment. The heat accumulated on the skin material 3 is increasingly collected by the heat conducting plates 11 which in turn transfer the collected heat to the heat pipe 13 such that the heat is released outside from the heat sink 12. The heat conducting plates 11 are separately provided so as to prevent deterioration in the moldability of the instrument panel 1.

Ninth Embodiment

Figure 12:
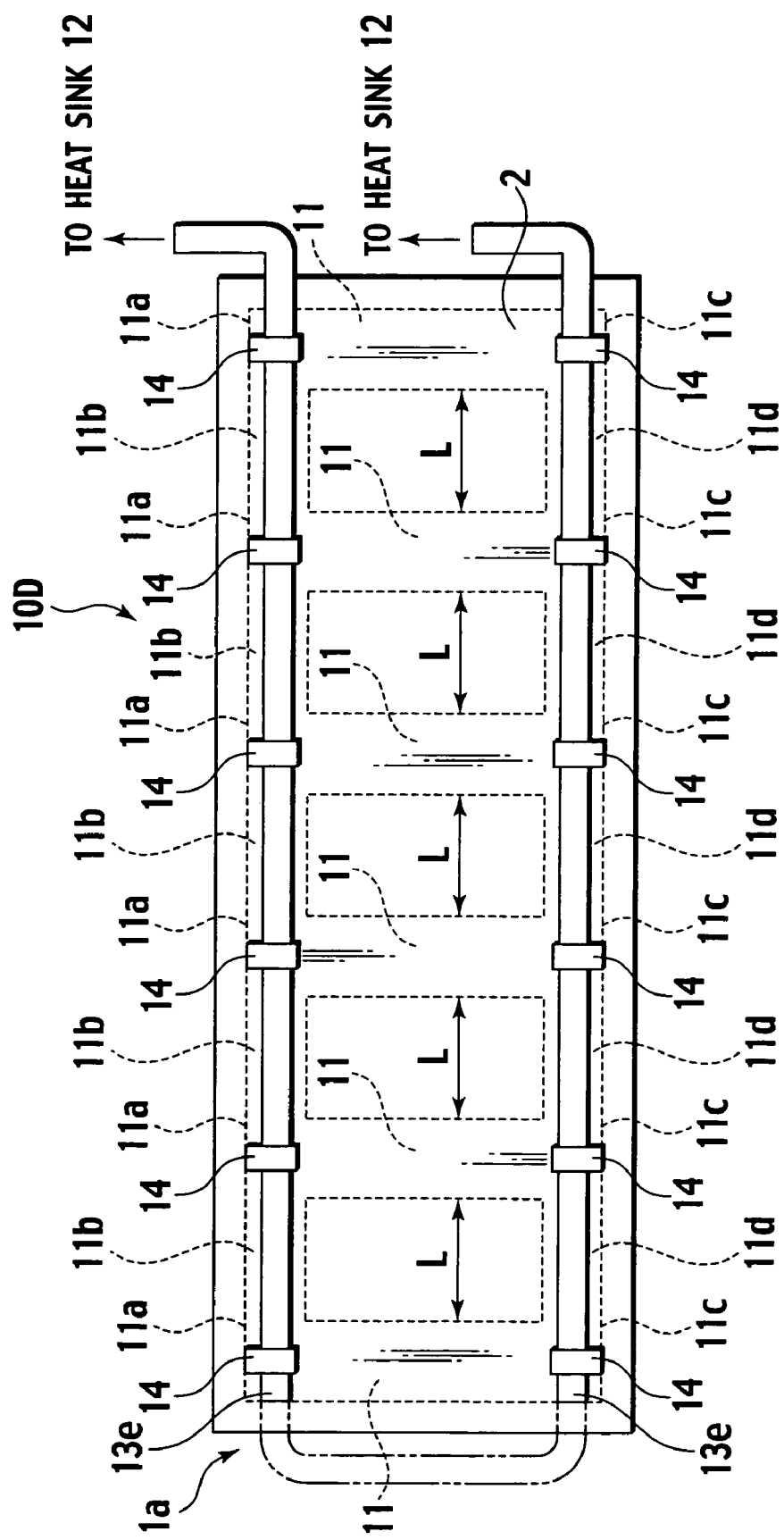
FIG. 12 is a bottom view of an essential portion of an instrument panel to which a heat-removing device for a vehicle according to a ninth embodiment of the present invention is installed.

FIG. 12 represents a ninth embodiment of the invention in which the same components as those of the fifth embodiment are designated as the same reference numerals. The description of those components, thus, will be omitted.

Referring to FIG. 12, a vehicle heat-removing device 10D of the embodiment has basically the same structure as that of the fifth embodiment, in which a plurality of heat conducting plates 11 are provided at predetermined intervals L in the longitudinal direction (the vehicle width direction) of the instrument panel 1.

The vehicle heat-removing device 10D of the embodiment is different from the vehicle heat-removing device 10 of the fifth embodiment in that two parallel heat pipes 13 are provided as indicated by the solid line shown in FIG. 12 each provided along both edge portions 11a, 11c of the heat conducting plates 11, respectively.

The heat pipes 13, 13 are connected to the plurality of brackets 14 each protruding downward from the baseboard 2, and being arranged along both edge portions 11a, 11c of the heat conducting plates 11. In this embodiment, the linear/straight heat pipes 13, 13 are employed.

The plurality of heat conducting plates 11 in this embodiment are connected at the respective edge portions 11a by the connecting portions 11b, and at the other edge portions 11c by the connecting portions 11d such that the heat conducting plates 11 collectively have a ladder-like shape.

Likewise the fifth embodiment (see FIG. 4), in this embodiment, the heat conducting plates 11 may be insert-molded into the baseboard 2 of the instrument panel 1 upon injection molding thereof. Likewise the sixth embodiment (see FIG. 6), the baseboard 2 may be formed of the outer baseboard 2b and the inner baseboard 2c so as to interpose the heat conducting plates 11 therebetween. Likewise the seventh embodiment (see FIG. 7), the skin material 3 may be formed of a skin surface material 3a and a soft pad 3b formed of the open-cell foam such that the heat conducting plates 11 are interposed between the baseboard 2 and the soft pad 3b.

In this embodiment, preferably the total area of the heat conducting plates 11 is set to be in the range between 20% and 80% of the area of the top board 1a of the instrument panel 1 receiving the direct sunlight.

Accordingly the vehicle heat-removing device 10D of the embodiment may provide the similar effects to those of the fifth embodiment. Likewise the fifth embodiment, two heat pipes 13, 13 are provided at both edge portions 11a, 11c of the heat conducting plates 11, and the center portions thereof are separated from one another. The temperature gradient is generated toward each of the edge portions 11a, 11c, whereby the heat transfer from the heat conducting plates 11 to the heat pipe 13 is promoted. Even in the case where only a part of the surface of the top board 1a of the instrument panel 1 is exposed to the sunlight, the heat flow is generated toward the end portion with sufficient heat transfer capacity. This makes the temperature of the entire surface of the top board 1a of the instrument panel uniformly decreased.

As each of the heat conducting plates 11 is separately provided, deterioration in the moldability of the instrument panel 1 can be prevented.

Figure 13:
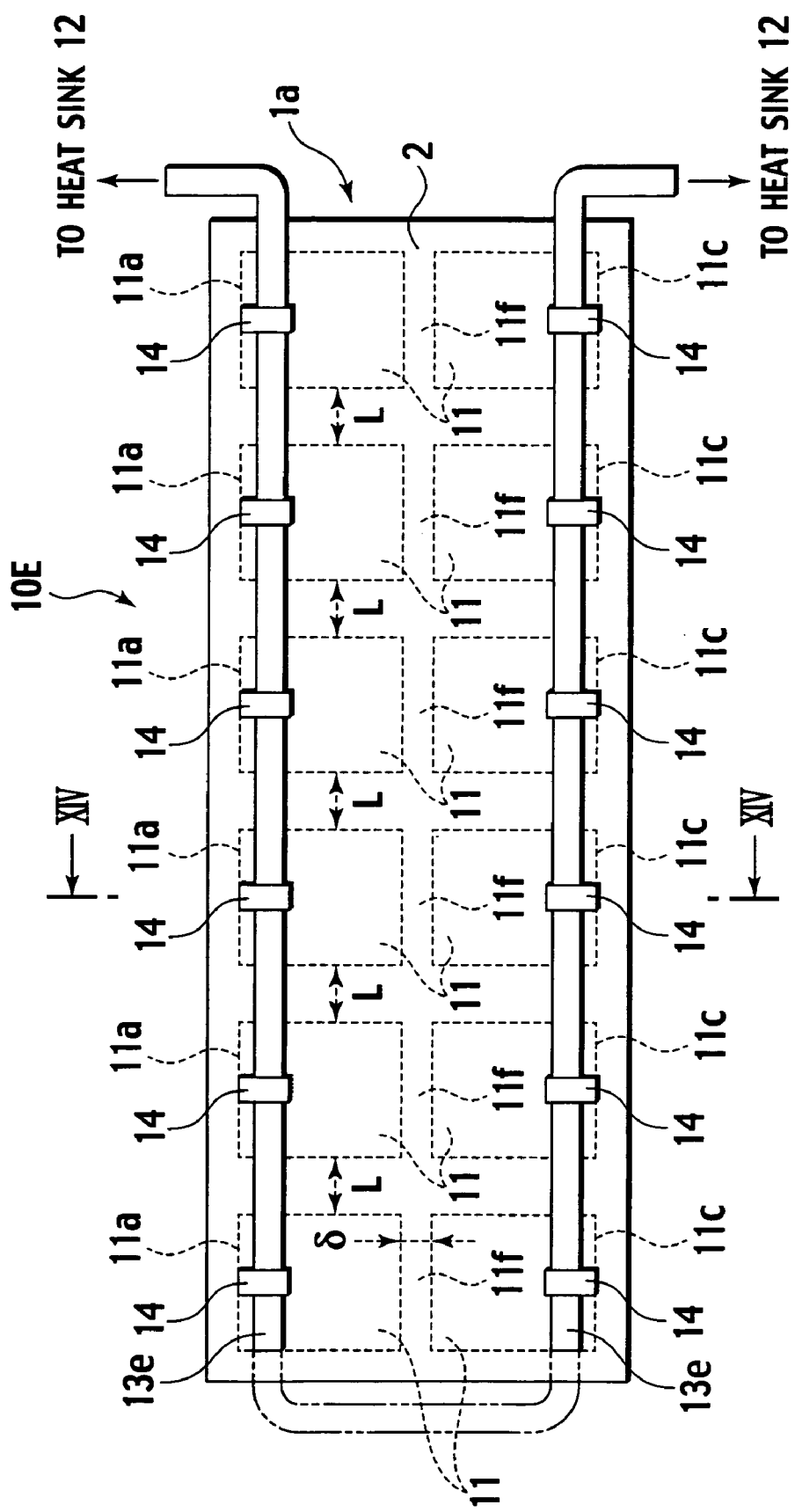
FIG. 13 is a bottom view of an essential portion of an instrument panel to which a heat-removing device for a vehicle according to a tenth embodiment of the present invention is installed.

The vehicle heat-removing device 10D of the embodiment is provided with two heat pipes 13, 13 as indicated by the solid line of FIG. 13. However, each end portion 13e of those two heat pipes 13, 13 may be joined together so as to be communicated for forming the loop heat pipe as indicated by the chain double-dashed line of FIG. 13.

Tenth Embodiment

Figure 14:
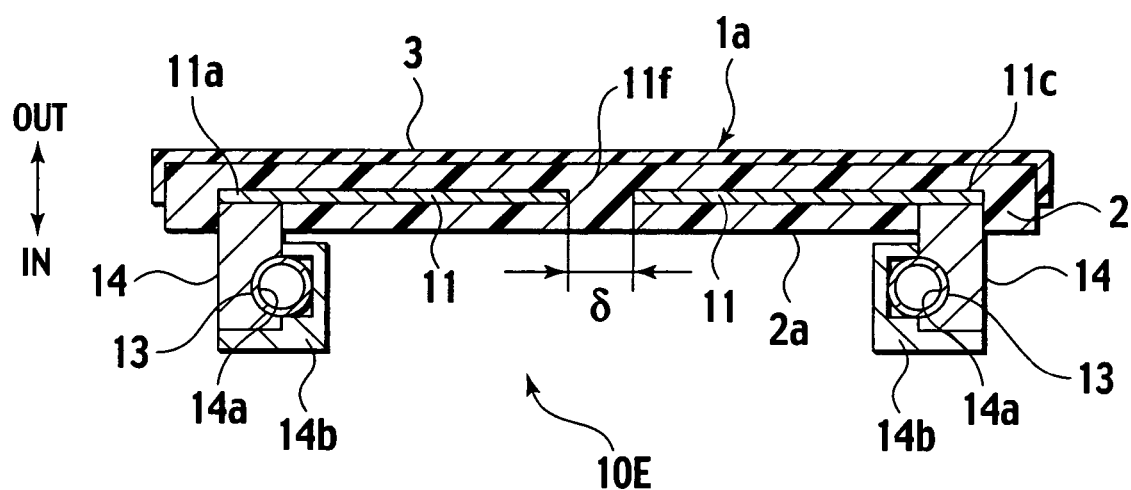
FIG. 14 is a sectional view taken along the line XIV-XIV of FIG. 13.

FIGS. 13, 14 represent a tenth embodiment of the invention in which the same components as those of the fifth and the ninth embodiments are designated as the same reference numerals. The description of those components, thus, will be omitted.

Referring to FIG. 13, a vehicle heat-removing device 10E of the embodiment has basically the same structure as that of the fifth embodiment. A plurality of heat conducting plates 11 are provided at predetermined intervals L in the longitudinal direction of the instrument panel 1. Likewise the ninth embodiment, in this embodiment, two heat pipes 13, 13 are disposed at both edge portions 11a, 11c of the heat conducting plates 11.

Referring to FIGS. 13, 14, the vehicle heat-removing device 10E of the embodiment is different from the vehicle heat-removing device 10D of the fifth embodiment in that the heat conducting plates 11 are separately provided in the same way as in the eighth embodiment (see FIG. 11) leaving each interval 6 in a center portion 11f between edge portions 11a and 11c of the respective heat conducting plates 11. The heat conducting plates 11, thus, are formed to collectively have a lattice-like shape.

In this embodiment, likewise the fifth embodiment (see FIG. 4), the heat conducting plates 11 may be insert-molded into the baseboard 2 of the instrument panel 1 upon injection molding thereof. As described in the sixth embodiment (see FIG. 6), the baseboard 2 may be formed of the outer baseboard 2b and the inner baseboard 2c so as to interpose the heat conducting plates 11 therebetween. Further as described in the seventh embodiment (see FIG. 7), the skin material 3 may be formed of the skin surface material 3a and the soft pad 3b formed of the open-cell foam such that the heat conducting plates 11 are interposed between the baseboard 2 and the soft pad 3b.

The vehicle heat-removing device 10E of the embodiment may provide the similar effects to those of the fifth embodiment. In this embodiment, two heat pipes 13, 13 are provided at both edge portions 11a, 11c of the heat conducting plates 11. As each temperature of the edge portions 11a and 11c of the heat conducting plates 11 is decreased, the temperature gradient of the heat conducting plate 11 between the edge portions 11a, 11c and the center portion 11f becomes large. This may promote the heat transfer from the heat conducting plates 11 to the heat pipe 13. In the case where the part of the top board 1a of the instrument panel 1 is exposed to the direct sunlight, the heat flows to the end portion with sufficient heat transfer capacity whereby the temperature on the entire surface of the top board 1a of the instrument panel is uniformly decreased.

In this embodiment, the heat conducting plates 11 are separately provided so as to prevent deterioration in the moldability of the instrument panel 1.

In the vehicle heat-removing device 10E of the embodiment, as indicated by the chain double-dashed line in FIG. 13, each end portion 13e of the heat pipes 13, 13 is joined together so as to be communicated for forming the loop heat pipe.

Heat-removing effect and moldability of the representative vehicle heat-removing devices of the vehicle heat-removing devices 10, 10A to 10E in the first to the sixth embodiments will be described referring to Table in FIG. 15 in reference to the comparative example shown in FIG. 16.

The "interior part" in Table of FIG. 15 represents the instrument panel 1 described in the respective embodiments. The embodiment case 1 represents the case where the heat conducting plates 11 have a comb-like shape (fifth embodiment), Case 2 represents the case where the heat conducting plates 11 have a ladder-like shape (ninth embodiment), Case 3 represents the case where the heat conducting plates 11 have a strip-like shape (eighth embodiment), and Case 4 represents the case where the heat conducting plate 11 have a lattice-like shape (tenth embodiment), respectively.

The comparative example shown in FIG. 16 has the structure in which the heat conducting plate P is attached to an inner surface Ka of an instrument panel K for collecting heat, and a heat pipe H is directly attached to the inner surface of the heat conducting plate P. The comparative example Case 1 represents the case where the heat conducting plate P has a strip-like shape, and Case 2 represents the case where the heat conducting plate P is formed of a single plate. Each of those comparative examples employs the linear/straight heat pipe in the same way as in the embodiments.

In order to make the conditions of the embodiment and the comparative example the same, the skin material has a surface formed of a thermoplastic resin material. In the experiment, the vehicle is left parked under the direct sunlight in summer at an amount of solar radiation of 850 W/m$^2$ at the maximum and average outside air temperature of 32° C.

The measurement was performed from 9:00 A.M. to 3:00 P.M. to record the temperature of the respective parts continuously and to make a comparison in the time zone at which the temperature becomes the highest.

Accordingly as shown in FIG. 15, in the case of the comparative examples Case 1 and Case 2, the air temperatures outside of and close to the instrument panel measured 68° C., 70° C., the surface temperatures measured 72° C., 75° C., and the inner air temperatures inside of the instrument panel measured 72 ° C., 75° C., respectively. Meanwhile, in the case of the embodiments Case 1, Case 2, Case 3, and Case 4, the air temperatures outside of and close to the instrument panel measured 55° C., 54° C., 55° C., 54° C., the surface temperatures measured 58° C., 57° C., 59° C., 57° C., and the inner air temperatures measured 56° C., 55° C., 56° C., 56° C., respectively. The vehicle heat-removing device according to any one of those embodiments greatly contributes to the temperature decrease.

Regarding the moldability, the comparative example Case 1 resulted in good (O), and Case 2 resulted in no good (X), and the embodiments Cases. 1, 3 and 4 resulted in good (O) while Case 2 resulted in tolerable (Δ).

The preferred embodiments described herein are illustrative and not restrictive, and the invention may be practiced or embodied in other ways without departing from the spirit or essential character thereof. For example, in these embodiments, the vehicle heat-removing devices 10, and 10A to 10E are applied to the instrument panel 1. However, it is to be understood that the invention is applicable to other interior part in the vehicle passenger compartment, for example, the rear parcel shelf 24. The scope of the invention being indicated by the claims, and all variations which come within the meaning of claims are intended to be embraced herein.

The present disclosure relates to subject matters contained in Japanese Patent Application No. 2004-374900, filed on Dec. 24, 2004, and Japanese Patent Application No. 2004-374906, filed on Dec. 24, 2004, the disclosures of which are expressly incorporated herein by reference in their entirety.

What is claimed is:

1. A heat-removing device for a vehicle comprising:
an interior part having a plate portion exposed to direct sunlight, the plate portion comprising a baseboard formed of a resin or a composite material containing a resin, and a skin material which covers an outer surface of the baseboard;
a heat conducting plate embedded in the baseboard and disposed on an inner side of the skin material of the plate portion, which collects heat from the skin material; and a heat pipe disposed on an inner side of an inner surface of the baseboard and connected in heat-conductive relationship to the heat conducting plate, which transfers heat collected by the heat conducting plate to a heat releasing device.

2. The heat-removing device according to claim 1, wherein the heat conducting plate is insert-molded into the baseboard of the interior part.

3. The heat-removing device according to claim 1, wherein the heat conducting plate has a plurality of brackets each protruding from the inner surface of the baseboard, and the heat pipe is connected in heat-conductive relationship to the heat conducting plate by the brackets.

4. The heat-removing device according to claim 1, wherein the heat pipe is connected to the heat conducting plate at a plurality of connecting points arranged along an edge portion of the heat conducting plate.

5. The heat-removing device according to claim 1, wherein the heat conducting plate is formed of a heat conductive material selected from the group consisting of copper, aluminum, iron, carbon fiber and a composite material thereof.

6. The heat-removing device according to claim 1, wherein a thickness of the heat conducting plate is equal to or larger than 0.1 mm and is 70% or less of a thickness of the plate portion between an outer surface of the skin material and the inner surface of the baseboard.

7. The heat-removing device according to claim 1, wherein the skin material has a skin surface material and a pad on the inner side thereof formed of open-cell foam.

8. The heat-removing device according to claim 1, wherein a plurality of the heat conducting plates are provided at predetermined intervals in a longitudinal direction of the interior part, and the heat pipe is connected in heat conductive relationship to the respective heat conducting plates.

9. The heat-removing device according to claim 8, wherein a total area of the plurality of the heat conducting plates is set to be in a range between 20% and 80% of an area of the plate portion receiving the direct sunlight.

10. The heat-removing device according to claim 1, wherein the baseboard comprises more than one baseboard.

11. A heat-removing method for an interior part of a vehicle, having a plate portion exposed to direct sunlight, the plate portion comprising a baseboard formed of a resin or a composite material containing a resin and a skin material which covers an outer surface of the baseboard, the heat-removing method comprising:

collecting heat using a heat conducting plate embedded in the baseboard and disposed on an inner side of the skin material; and transferring the heat collected by the heat conducting plate to a heat releasing device via a heat pipe which is disposed on an inner side of an inner surface of the baseboard and connected in heat-conductive relationship to the heat conducting plate.

* * * * *